US010912966B2

(12) United States Patent
Krutskevych

(10) Patent No.: US 10,912,966 B2
(45) Date of Patent: Feb. 9, 2021

(54) VALVE ASSEMBLY

(71) Applicant: Marioff Corporation Oy, Vantaa (FI)

(72) Inventor: Nazar Krutskevych, Pomorske (PL)

(73) Assignee: MARIOFF CORPORATION OY, Vantaa (FI)

( * ) Notice: Subject to any disclaimer, the term of this patent is extended or adjusted under 35 U.S.C. 154(b) by 88 days.

(21) Appl. No.: 16/260,885

(22) Filed: Jan. 29, 2019

(65) Prior Publication Data
US 2019/0232097 A1 Aug. 1, 2019

(30) Foreign Application Priority Data

Jan. 29, 2018 (EP) .................................. 18397505

(51) Int. Cl.
*A62C 35/68* (2006.01)
*F16K 37/00* (2006.01)
(Continued)

(52) U.S. Cl.
CPC .............. *A62C 37/50* (2013.01); *A62C 35/68* (2013.01); *F16K 31/0655* (2013.01);
(Continued)

(58) Field of Classification Search
CPC ............. F16K 31/0655; F16K 37/0083; F16K 37/0041; A62C 37/50; A62C 35/68; H01F 7/1844; G01S 3/80
(Continued)

(56) References Cited

U.S. PATENT DOCUMENTS

RE29,330 E * 8/1977 Stewart .................. F16L 41/02
137/551
4,267,889 A * 5/1981 Williams ............... A62C 37/36
169/61
(Continued)

FOREIGN PATENT DOCUMENTS

| CN | 1369319 A | 9/2002 |
|---|---|---|
| EP | 0663552 A1 | 7/1995 |
| JP | 2015184029 A | 10/2015 |

OTHER PUBLICATIONS

European Search Report for Application No. 18397505.1-1113; dated Jun. 21, 2018; 7pgs.

*Primary Examiner* — Jacques M Saint Surin
(74) *Attorney, Agent, or Firm* — Cantor Colburn LLP

(57) ABSTRACT

Disclosed is a valve assembly for a fire suppression system, the valve assembly having: a valve armature having a top portion and a bottom portion spaced from the top portion along a longitudinal axis, the bottom portion including an armature cavity that includes a cavity inlet for receiving fluid and a cavity outlet proximate a bottom portion of the cavity for delivering fluid, a plunger slidable along the longitudinal axis within the armature cavity, between a closed state and an open state, wherein: in the closed state the plunger is at a predetermined bottom position in the armature cavity proximate the cavity outlet for fluidly sealing the cavity outlet; and in the open state the plunger is in a predetermined top position in the cavity distal the cavity outlet, and a monitoring system operatively connected to the valve armature, the monitoring system acoustically sensing whether the plunger is longitudinally misaligned.

16 Claims, 2 Drawing Sheets

(51) Int. Cl.
  *H01F 7/18* (2006.01)
  *F16K 31/06* (2006.01)
  *G01S 3/80* (2006.01)
  *A62C 37/50* (2006.01)

(52) U.S. Cl.
  CPC ...... *F16K 37/0041* (2013.01); *F16K 37/0083* (2013.01); *G01S 3/80* (2013.01); *H01F 7/1844* (2013.01)

(58) Field of Classification Search
  USPC .............................................................. 73/587
  See application file for complete search history.

(56) References Cited

U.S. PATENT DOCUMENTS

| | | |
|---|---|---|
| 4,920,802 A | 5/1990 | McMullin et al. |
| 4,977,778 A | 12/1990 | Nafziger et al. |
| 5,008,841 A | 4/1991 | McElroy |
| 5,153,522 A | 10/1992 | Sano |
| 5,228,342 A | 7/1993 | McShane |
| 5,257,545 A | 11/1993 | Au-Yang |
| 5,477,149 A | 12/1995 | Spencer et al. |
| 6,164,324 A | 12/2000 | Gradle |
| 6,453,261 B2 | 9/2002 | Boger et al. |
| 6,530,277 B2 | 3/2003 | Kumpfmueller |
| 7,318,350 B2 | 1/2008 | Boken |
| 7,405,917 B2 | 7/2008 | Ahrens et al. |
| 7,877,194 B2 | 1/2011 | Suyama |
| 7,940,189 B2 | 5/2011 | Brown |
| 8,147,211 B2 | 4/2012 | Grant et al. |
| 8,191,409 B2 * | 6/2012 | Bacic ................. F16K 37/0083 73/112.01 |
| 8,421,643 B2 | 4/2013 | Grumstrup |
| 8,453,674 B2 | 6/2013 | Cordle et al. |
| 9,494,560 B2 | 11/2016 | Carder et al. |
| 9,557,303 B2 | 1/2017 | Delgado et al. |
| 2005/0254973 A1 * | 11/2005 | Berger ................ F16K 31/0672 417/416 |
| 2009/0321671 A1 * | 12/2009 | Curtis ................ F16K 31/0624 251/129.15 |
| 2010/0072812 A1 * | 3/2010 | Voss ........................ B60T 8/363 303/119.3 |
| 2013/0118765 A1 * | 5/2013 | Smith .................... A62C 35/08 169/61 |

* cited by examiner

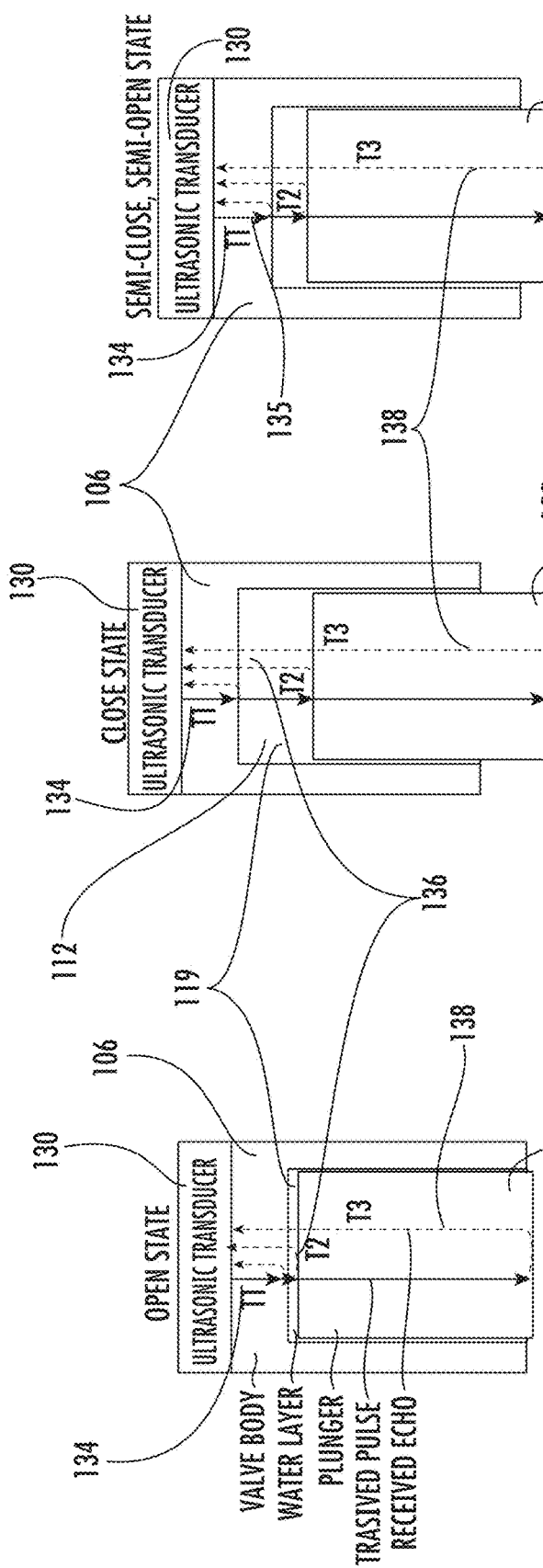
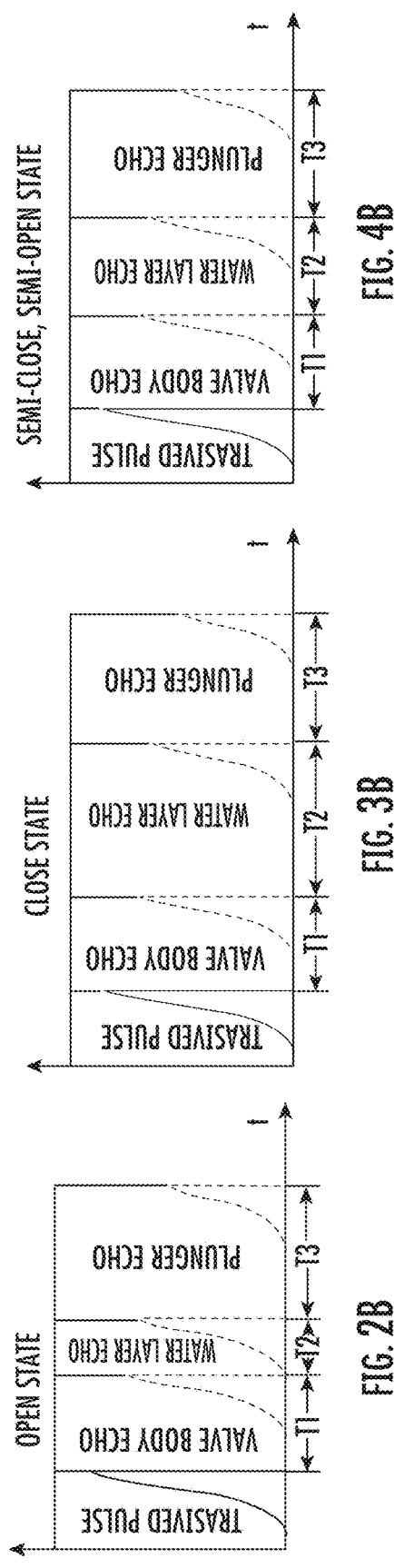

VALVE ASSEMBLY

CROSS-REFERENCE TO RELATED APPLICATIONS

This application claims the benefit of an earlier filing date from European Application Serial No. 18397505.1 filed Jan. 29, 2018, the entire disclosure of which is incorporated herein by reference.

BACKGROUND

Exemplary embodiments pertain to the art of fire suppression systems and more specifically to a valve assembly for a fire suppression system.

Fire suppression systems may rely on plunger valves, such as solenoid controlled plunger valves, for delivering fire suppressant fluid in an emergency. Maintaining the health of the electrical and mechanical components of these valves assures proper operation. Testing of the components may require partial disassembly, which may be time consuming and costly. Accordingly, nonintrusive testing of the solenoid valves is preferred.

BRIEF DESCRIPTION

Disclosed is a valve assembly for a fire suppression system, the valve assembly comprising: a valve armature having a top portion and a bottom portion spaced from the top portion along a longitudinal axis, the bottom portion including an armature cavity, the armature cavity including a cavity inlet for receiving fluid and a cavity outlet proximate a bottom portion of the cavity for delivering fluid, a plunger slidable along the longitudinal axis within the armature cavity, the plunger slidable between a closed state and an open state, wherein: in the closed state the plunger is at a predetermined bottom position in the armature cavity that is proximate the cavity outlet for fluidly sealing the cavity outlet; and in the open state the plunger is in a predetermined top position in the cavity that is distal the cavity outlet, and a monitoring system operatively connected to the valve armature, the monitoring system acoustically sensing whether the plunger is longitudinally misaligned when the plunger is in the closed state and the open state.

In addition to one or more of the above disclosed features, or as an alternative, the top portion of the valve armature fluidly isolates the monitoring system from the bottom portion of the valve armature, and the monitoring system includes an ultrasonic transducer operatively connected to the top portion of the valve armature, and a pulse-transmitting and echo-receiving circuit operatively connected to the ultrasonic transducer.

In addition to one or more of the above disclosed features, or as an alternative, the monitoring system transmits an ultrasonic pulse into the valve armature and receives a plurality of ultrasonic echoes including: a first ultrasonic echo from the ultrasonic pulse traveling through the top portion of the valve armature, a second ultrasonic echo from the ultrasonic pulse traveling through the fluid, and a third ultrasonic echo from the ultrasonic pulse traveling through the plunger.

In addition to one or more of the above disclosed features, or as an alternative, the monitoring system includes: a processing unit operatively connected to the pulse-transmitting and echo-receiving circuit for measuring a plurality of acoustic travel periods including: a first acoustic travel period between transmission of the ultrasonic pulse and reception of the first ultrasonic echo, a second acoustic travel period between transmission of the ultrasonic pulse and reception of the second ultrasonic echo, and a third acoustic travel period between transmission of the ultrasonic pulse and reception of the third ultrasonic echo, and determining from the plurality of the travel periods whether the plunger is longitudinally misaligned.

In addition to one or more of the above disclosed features, or as an alternative, the monitoring system includes an electronic control unit for controlling the monitoring system to monitor whether the plunger is longitudinally misaligned when the plunger is in the closed state and the open state.

In addition to one or more of the above disclosed features, or as an alternative, when the plunger is in the open state, the monitoring system determines the plunger is longitudinally aligned by: determining that the plurality of acoustic travel periods are within a first predetermined tolerance indicative of the plunger being at the predetermined top position.

In addition to one or more of the above disclosed features, or as an alternative, when the plunger is in the open state, the monitoring system determines the plunger is longitudinally misaligned by: determining that the second acoustic travel period is longer than the first predetermined tolerance and indicative of the plunger being below the predetermined top position.

In addition to one or more of the above disclosed features, or as an alternative, when the plunger is in the closed state, the monitoring system determines the plunger is longitudinally aligned by: determining that the plurality of acoustic travel periods are within a second predetermined tolerance indicative of the plunger being at the predetermined bottom position.

In addition to one or more of the above disclosed features, or as an alternative, when the plunger is in the closed state, the monitoring system determines the plunger is longitudinally misaligned by: determining that the second acoustic travel period is shorter than the second predetermined tolerance and indicative of the plunger being above the predetermined bottom position.

In addition to one or more of the above disclosed features, or as an alternative, the ultrasonic transducer is fixedly mounted at the top portion of the valve armature.

In addition to one or more of the above disclosed features, or as an alternative, the assembly further comprises: a solenoid disposed within the cavity, the solenoid being operatively connected to the plunger for sliding the plunger between the closed state and the open state, and a solenoid controller electronically connected to the solenoid for controlling operation of the solenoid.

In addition to one or more of the above disclosed features, or as an alternative, the assembly further comprises: an armature housing having a top surface and a bottom surface spaced along the longitudinal axis, a channel disposed in the armature housing, the channel having: a top opening at the top surface of the housing; and a bottom opening at the bottom surface of the housing, wherein the valve armature is fixedly disposed within the channel, the top portion of the valve armature is proximate the top surface of the armature housing, and the bottom portion of the valve armature is proximate the bottom surface of the armature housing.

In addition to one or more of the above disclosed features, or as an alternative, the armature housing includes: a fluid inlet for communicating fluid from a supply conduit that supplies fluid to the valve armature.

In addition to one or more of the above disclosed features, or as an alternative, the assembly includes a fluid exhaust housing fixedly connected to the bottom surface of the housing and fluidly connected to the cavity outlet in the valve armature, the fluid exhaust housing includes at least one passage for directing fluid away from the cavity outlet.

Further disclosed is a method of testing longitudinal alignment of a plunger in a valve assembly for a fire suppression system, the method comprising: transmitting an ultrasonic pulse into a valve armature and sequentially receiving a plurality of ultrasonic echoes including: a first ultrasonic echo from interaction between the ultrasonic pulse and a top portion of the valve armature, a second ultrasonic echo from interaction between the ultrasonic pulse and fluid within a bottom portion of the valve armature, and a third ultrasonic echo from interaction between the ultrasonic pulse and a plunger within the bottom portion of the valve armature.

In addition to one or more of the above disclosed features, or as an alternative, the method comprises measuring a plurality of acoustic travel periods including: a first acoustic travel period between transmission of the ultrasonic pulse and reception of the first ultrasonic echo, a second acoustic travel period between transmission of the ultrasonic pulse and reception of the second ultrasonic echo, and a third acoustic travel period between transmission of the ultrasonic pulse and reception of the third ultrasonic echo, and determining from the plurality of the travel periods whether the plunger is longitudinally misaligned.

In addition to one or more of the above disclosed features, or as an alternative, when the plunger is in the open state, the method comprises of determining the plunger is longitudinally aligned by: determining that the plurality of acoustic travel periods are within a first predetermined tolerance indicative of the plunger being at the predetermined top position.

In addition to one or more of the above disclosed features, or as an alternative, when the plunger is in the open state, the method comprises determining the plunger is longitudinally misaligned by: determining that the second acoustic travel period is longer than the first predetermined tolerance and indicative of the plunger being below the predetermined top position.

In addition to one or more of the above disclosed features, or as an alternative, when the plunger is in the closed state, the method includes determining the plunger is longitudinally aligned by: determining that the plurality of acoustic travel periods are within a second predetermined tolerance indicative of the plunger being at the predetermined bottom position.

In addition to one or more of the above disclosed features, or as an alternative, when the plunger is in the closed state, the method includes determining the plunger is longitudinally misaligned by: determining that the second acoustic travel period is shorter than the second predetermined tolerance and indicative of the plunger being above the predetermined top position.

BRIEF DESCRIPTION OF THE DRAWINGS

The following descriptions should not be considered limiting in any way. With reference to the accompanying drawings, like elements are numbered alike:

FIGS. 2A-2B illustrate a valve assembly in an open state according to an embodiment;

FIGS. 3A-3B illustrate a valve assembly in a closed state according to an embodiment; and FIGS. 4A-4B illustrate a valve assembly in a semi-closed or semi-open state according to an embodiment.

DETAILED DESCRIPTION

Figure 1:
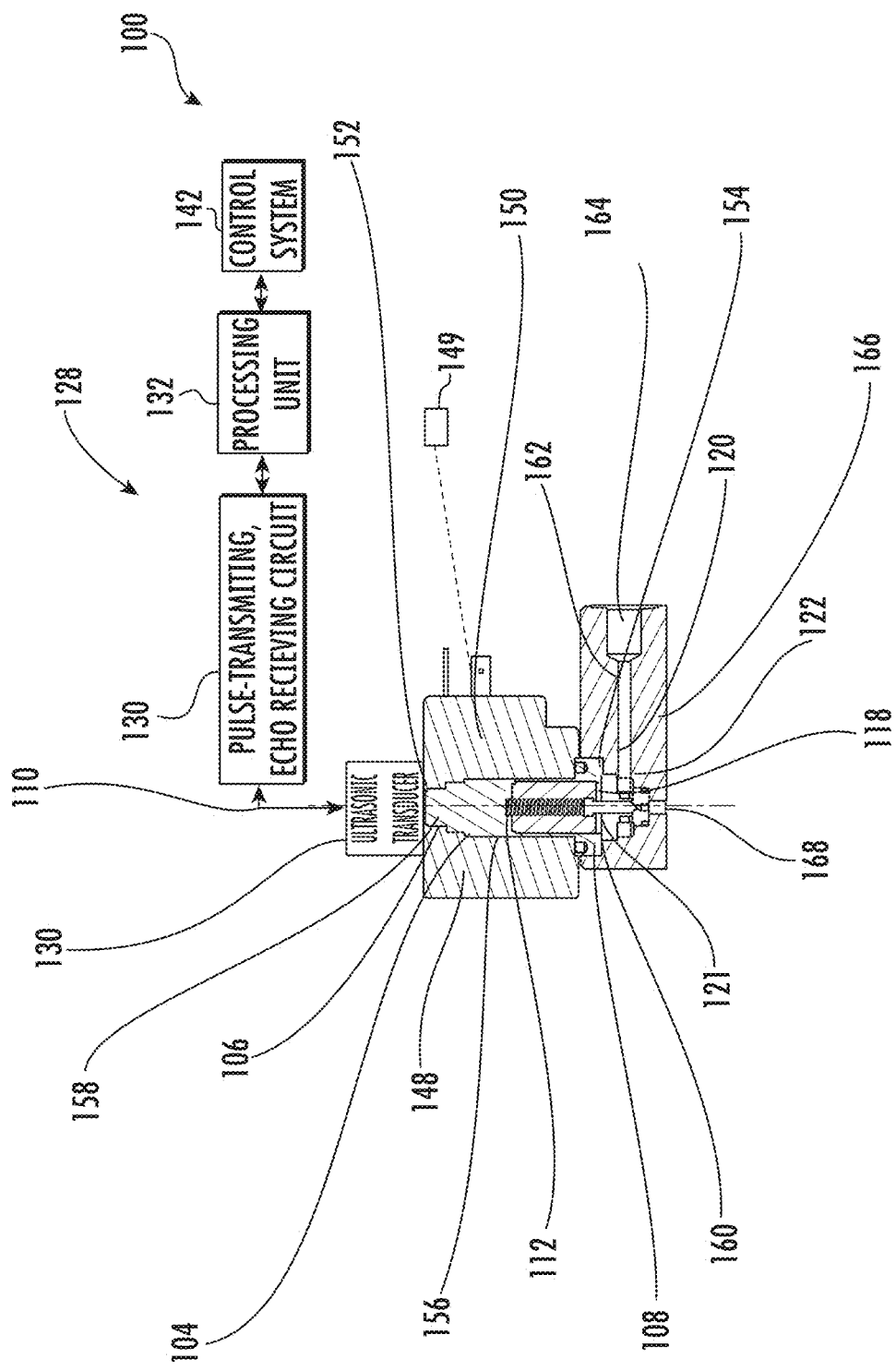
FIG. 1 illustrates a valve assembly according to an embodiment.

A detailed description of one or more embodiments of the disclosed apparatus and method are presented herein by way of exemplification and not limitation with reference to the Figures.

Turning to FIG. 1, a valve assembly 100 for a fire suppression system is disclosed. The valve assembly 100 may include a valve armature 104 having a top portion 106 and a bottom portion 108 spaced from the top portion 106 along a longitudinal axis 110. The bottom portion 108 may include an armature cavity 112. The armature cavity 112 may include a cavity inlet 118 for receiving fluid 119 (FIG. 2A) and a cavity outlet 120 proximate a bottom portion 121 of the cavity 120 for delivering fluid. The fluid 119 may be fire suppressant fluid, such as water, which may be delivered as mist.

A plunger 122 may be slidable along the longitudinal axis 110 within the armature cavity 112. The plunger 122 may be slidable between a closed state and an open state. In the closed state, the plunger 122 may be at a predetermined bottom position in the armature cavity 112 that is proximate the cavity outlet 120 for fluidly sealing the cavity outlet 120. This may be the state of the plunger when no fire is being addressed by the system. In the open state, the plunger 122 may be in a predetermined top position in the cavity 120 that is distal the cavity outlet 120. This configuration may allow fluid to pass out of the cavity outlet to address and extinguish a fire.

A monitoring system 128 may be operatively connected to the valve armature 104. The monitoring system 128 may acoustically sense whether the plunger 122 is longitudinally misaligned when the plunger 122 is in the closed state and the open state. This monitoring may be performed in situ, that is, without having to disassemble the valve system. Such a system may allow for remotely and regularly monitoring the health of the valve so that early and accurate detection of valve faults may be achieved. In addition, invasive disassembly of the valves may only be required for valves with identified faults rather than for determining whether a fault exists.

Turning now to FIGS. 2A-4B, the top portion 106 of the valve armature 104 may fluidly isolate the monitoring system 128 from the bottom portion 108 of the valve armature 104. That is, the cavity in the valve armature may be manufactured as a blind hole in the bottom side of a solid material, and the monitoring system 128 may be positioned on the top side of the solid material. According to an embodiment, the monitoring system 128 may include an ultrasonic transducer 130 operatively connected to the top portion 106 of the valve armature 104, and a pulse-transmitting and echo-receiving circuit 132 operatively connected to the ultrasonic transducer 130.

As illustrated in FIGS. 2A, 3A and 4A, the monitoring system 128 may transmit an ultrasonic pulse 134 into the valve armature 104 and receive a plurality of ultrasonic echoes from the transmitted pulse. The echoes may include a first ultrasonic echo 135 from the ultrasonic pulse 134 traveling through the top portion 106 of the valve armature 104. The echoes may also include a second ultrasonic echo 136 from the ultrasonic pulse 134 traveling through the fluid 119 in the cavity. Fluid may be in the cavity when the valve is closed due to being supplied to the valve from a supply conduit 164 (FIG. 1), discussed below. Fluid may be in the cavity when the valve is open because the valve is fluidly connecting the supply conduit 164 with a fluid exhaust passage 168, discussed below. The echoes may further include a third ultrasonic echo 138 from the ultrasonic pulse 134 traveling through the plunger 122.

With reference to FIGS. 1-4B the monitoring system 128 may include a processing unit 140 operatively connected to the pulse-transmitting and echo-receiving circuit 132 for measuring a plurality of acoustic travel periods. The acoustic travel periods may include a first acoustic travel period having a duration of t1 measured between transmission of the ultrasonic pulse and reception of the first ultrasonic echo. The acoustic travel periods may include a second acoustic travel period having a duration t2 measured between transmission of the ultrasonic pulse and reception of the second ultrasonic echo. The acoustic travel periods may include a third acoustic travel period having a duration t3 measured between transmission of the ultrasonic pulse and reception of the third ultrasonic echo. The monitoring system 128 may determine from the plurality of the travel periods whether the plunger 122 is longitudinally misaligned.

The monitoring system 122 may include an electronic control unit 142 for controlling the monitoring system 128 to monitor whether the plunger 122 is longitudinally misaligned when the plunger 122 is in the closed state and the open state. With reference to FIGS. 2A, 2B, 4A and 4B, when the plunger 122 is in the open state, the monitoring system 128 may determine the plunger 122 is longitudinally aligned by determining that the plurality of acoustic travel periods are within a first predetermined tolerance indicative of the plunger 122 being at the predetermined top position in the cavity. On the other hand, when the plunger 122 is in the open state, the monitoring system 128 determines the plunger is longitudinally misaligned by determining that the second acoustic travel period is longer than the first predetermined tolerance and indicative of the plunger 122 being below the predetermined top position in the cavity. Acceptable tolerances indicative of good health of the valve assembly may be measured in millimeters or the like.

The time t1 of reflection through the top portion of the cavity will not change because the top portion of the cavity is typically a solid and stationary structure. Similarly, the difference between time t3 and time t2, that is the different between the echo reflection through the plunger and the fluid, will not change because this time segment represents travel through the plunger, which is also typically solid. Thus if time t2 and time t3 both are outside of the acceptable tolerance, while the difference between time t3 and time t2 is within the acceptable tolerance, then the acoustic travel time is lengthen due to the travel through the fluid. This is indicative of the plunger being lower than the predetermined top position for the closed state. This may be considered a malfunction as the configuration may result in unacceptable leaking of fluid. Thus, the valve may be compromised and should be changed.

With reference to FIGS. 3A-4B, when the plunger 122 is in the closed state, the monitoring system 128 determines the plunger 122 is longitudinally aligned by determining that the plurality of acoustic travel periods are within a second predetermined tolerance and indicative of the plunger 122 being at the predetermined bottom position relative to the cavity. When the plunger 122 is in the closed state, the monitoring system 128 determines the plunger 122 is longitudinally misaligned by determining that the second acoustic travel period is shorter than the second predetermined tolerance and indicative of the plunger 122 being above the predetermined bottom position. Here too, acceptable tolerances indicative of good health of the valve assembly may be measured in millimeters or the like.

Similarly, if time t2 and time t3 both are outside of the acceptable tolerance, while the difference between time t3 and time t2 is within the acceptable tolerance, then the acoustic travel time is shortened due to the travel through the fluid. This is indicative of the plunger being higher than the predetermined top position for the closed state. This may be considered a malfunction as the configuration may result in preventing a full flow from reaching a fire. Thus, the valve may be compromised and should be changed.

Turning back to FIG. 1 additional features of the structure of the valve assembly will be addressed. The ultrasonic transducer 130 is fixedly mounted at the top portion 106 of the valve armature 104. With this configuration, the ultrasonic transducer 130 is fluidly separated from the cavity by the structure forming the top portion of the valve armature.

A solenoid 148 is disposed within the cavity 112 to drive the plunger. That is, the solenoid 148 is operatively connected to the plunger 122 for sliding the plunger 122 between the closed state and the open state. In addition, a solenoid controller 149 is electronically connected to the solenoid 148 for controlling operation of the solenoid 148. Other forms of mechanical, electrical or magnetic drives for the plunger are within the scope of the disclosure. It is to be appreciated that fault within the system determined herein may be directly caused by the drive mechanism for the plunger.

An armature housing 150 is disclosed having a top surface 152 and a bottom surface 154 spaced along the longitudinal axis 110. A channel 156 is disposed in the armature housing 150. The channel 156 has a top opening 158 at the top surface 152 of the housing 150 and a bottom opening 160 at the bottom surface 154 of the housing 150. The valve armature 104 is fixedly disposed within the channel 156. In this configuration, the top portion 106 of the valve armature 104 is proximate the top surface 152 of the armature housing 150 and the bottom portion 108 of the valve armature 104 is proximate the bottom surface 154 of the armature housing 150.

The armature housing 150 includes a fluid inlet 162 for communicating fluid 119 from a supply conduit 164 that supplies fluid to the valve armature 104. A fluid exhaust housing 166 is fixedly connected to the bottom surface of the housing 154 and fluidly connected to the cavity outlet 120 in the valve armature 104. The fluid exhaust housing 166 includes at least one passage 168 for directing fluid away from the cavity outlet 120.

In sum, disclosed is a system that is able to recognize the health of a plunger valve without any contact with a controlling medium (liquid, gas). The term "about" is intended to include the degree of error associated with measurement of the particular quantity based upon the equipment available at the time of filing the application. This solution may be retrofitted to existing fire suppressant systems as would be appreciated by one of ordinary skill in the art.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A valve assembly for a fire suppression system, the valve assembly comprising:
   a valve armature having a top portion and a bottom portion spaced from the top portion along a longitudinal axis, the bottom portion including an armature cavity, the armature cavity including a cavity inlet for receiving fluid and a cavity outlet proximate a bottom portion of the cavity for delivering fluid,
   a plunger slidable along the longitudinal axis within the armature cavity, the plunger slidable between a closed state and an open state, wherein: in the closed state the plunger is at a predetermined bottom position in the armature cavity that is proximate the cavity outlet for fluidly sealing the cavity outlet; and in the open state the plunger is in a predetermined top position in the cavity that is distal the cavity outlet, and
   a monitoring system operatively connected to the valve armature, the monitoring system acoustically sensing whether the plunger is longitudinally misaligned when the plunger is in the closed state and the open state;
   wherein:
   the top portion of the valve armature fluidly isolates the monitoring system from the bottom portion of the valve armature, and
   the monitoring system includes an ultrasonic transducer operatively connected to the top portion of the valve armature, and a pulse-transmitting and echo-receiving circuit operatively connected to the ultrasonic transducer,
   wherein:
   the monitoring system transits an ultrasonic pulse into the valve armature and receives a plurality of ultrasonic echoes including:
   a first ultrasonic echo from the ultrasonic pulse traveling through the top portion of the valve armature,
   a second ultrasonic echo from the ultrasonic pulse traveling through the fluid, and
   a third ultrasonic echo from the ultrasonic pulse traveling through the plunger, and
   wherein the monitoring system includes;
   a processing unit operatively connected to the pulse-transmitting and echo-receiving circuit for measuring a plurality of acoustic travel periods including:
   a first acoustic travel period between transmission of the ultrasonic pulse and reception of the first ultrasonic echo,
   a second acoustic travel period between transmission of the ultrasonic pulse and reception of the second ultrasonic echo, and
   a third acoustic travel period between transmission of the ultrasonic pulse and reception of the third ultrasonic echo, and
   determining from the plurality of the travel periods whether the plunger is longitudinally misaligned.

2. The assembly of claim 1 wherein the monitoring system includes an electronic control unit for controlling the monitoring system to monitor whether the plunger is longitudinally misaligned when the plunger is in the closed state and the open state.

3. The assembly of claim 2 wherein when the plunger is in the open state, the monitoring system determines the plunger is longitudinally aligned by:
   determining that the plurality of acoustic travel periods are within a first predetermined tolerance indicative of the plunger being at the predetermined top position.

4. The assembly of claim 3 wherein when the plunger is in the open state, the monitoring system determines the plunger is longitudinally misaligned by:
   determining that the second acoustic travel period is longer than the first predetermined tolerance and indicative of the plunger being below the predetermined top position.

5. The assembly of claim 2 wherein when the plunger is in the closed state, the monitoring system determines the plunger is longitudinally aligned by:
   determining that the plurality of acoustic travel periods are within a second predetermined tolerance indicative of the plunger being at the predetermined bottom position.

6. The assembly of claim 5 wherein when the plunger is in the closed state, the monitoring system determines the plunger is longitudinally misaligned by:
   determining that the second acoustic travel period is shorter than the second predetermined tolerance and indicative of the plunger being above the predetermined bottom position.

7. The assembly of claim 2 wherein the ultrasonic transducer is fixedly mounted at the top portion of the valve armature.

8. The assembly of claim 7 further comprising:
   a solenoid disposed within the cavity, the solenoid being operatively connected to the plunger for sliding the plunger between the closed state and the open state, and a solenoid controller electronically connected to the solenoid for controlling operation of the solenoid.

9. The assembly of claim 8 further comprising:
   an armature housing having a top surface and a bottom surface spaced along the longitudinal axis,
   a channel disposed in the armature housing, the channel having: a top opening 158 at the top surface of the housing; and a bottom opening at the bottom surface of the housing,
   wherein the valve armature is fixedly disposed within the channel, the top portion of the valve armature is proximate the top surface of the armature housing, and the bottom portion of the valve armature is proximate the bottom surface of the armature housing.

10. The assembly of claim 9 wherein the armature housing includes: a fluid inlet for communicating fluid from a supply conduit 164 that supplies fluid to the valve armature.

11. The assembly of claim 10 including a fluid exhaust housing fixedly connected to the bottom surface of the housing and fluidly connected to the cavity outlet in the valve armature, the fluid exhaust housing includes at least one passage for directing fluid away from the cavity outlet.

12. A method of testing longitudinal alignment of a plunger in a valve assembly for a fire suppression system, the method comprising:
  transmitting an ultrasonic pulse into a valve armature and sequentially receiving a plurality of ultrasonic echoes including:
    a first ultrasonic echo from interaction between the ultrasonic pulse and a top portion of the valve armature,
    a second ultrasonic echo from interaction between the ultrasonic pulse and fluid within a bottom portion of the valve armature, and
    a third ultrasonic echo from interaction between the ultrasonic pulse and a plunger within the bottom portion of the valve armature, and
  measuring a plurality of acoustic travel periods including:
  a first acoustic travel period between transmission of the ultrasonic pulse and reception of the first ultrasonic echo,
  a second acoustic travel period between transmission of the ultrasonic pulse and reception of the second ultrasonic echo, and
  a third acoustic travel period between transmission of the ultrasonic pulse and reception of the third ultrasonic echo, and
  determining from the plurality of the travel periods whether the plunger is longitudinally misaligned.

13. The method of claim 12 wherein when the plunger is in the open state, the method comprises determining the plunger is longitudinally aligned by:
  determining that the plurality of acoustic travel periods are within a first predetermined tolerance indicative of the plunger being at the predetermined top position.

14. The method of claim 13 wherein when the plunger is in the open state, the method comprises determining the plunger is longitudinally misaligned by:
  determining that the second acoustic travel period is longer than the first predetermined tolerance and indicative of the plunger being below the predetermined top position.

15. The method of claim 13 wherein when the plunger is in the closed state, the method includes determining the plunger is longitudinally aligned by:
  determining that the plurality of acoustic travel periods are within a second predetermined tolerance indicative of the plunger being at the predetermined bottom position.

16. The method of claim 15 wherein when the plunger is in the closed state, the method includes determining the plunger is longitudinally misaligned by:
  determining that the second acoustic travel period is shorter than the second predetermined tolerance and indicative of the plunger being above the predetermined top position.

* * * * *